United States Patent Office 3,378,560
Patented Apr. 16, 1968

3,378,560
ACYLOXY AND HYDROXY SUBSTITUTED QUINOLIZINES
Richard E. Brown, Hanover, and Robert I. Meltzer, Rockaway, N.J., assignors to Warner-Lambert Pharmaceutical Company, Morris Plains, N.J., a corporation of Delaware
No Drawing. Filed July 21, 1965, Ser. No. 473,810
10 Claims. (Cl. 260—286)

This invention relates to novel substituted acyloxy and hydroxy substituted quinolizines of the formula:

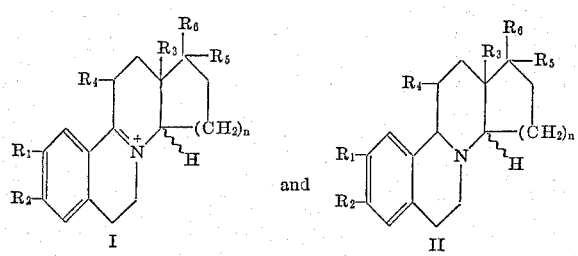

wherein $R_1$ and $R_2$ each represent hydrogen, hydroxy, lower alkoxy of 1 to 6 carbon atoms such as methoxy, ethoxy, propoxy, isopropoxy and the like or $R_1$ and $R_2$ taken together form a methylenedioxy group; $R_3$ represents hydrogen or lower alkyl of 1 to 6 carbon atoms such as methyl, ethyl, propyl, isopropyl and the like; $R_4$ may be hydroxy; acyloxy of 1 to 6 carbon atoms such as acetoxy, formyloxy, propyloxy and the like; or keto; $R_5$ represents hydrogen, carboxy or a carboxy derivative such as $-COOR_7$ in which $R_7$ may be lower alkyl of 1 to 6 carbon atoms or

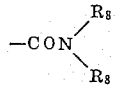

in which $R_8$ may be hydrogen or lower alkyl of 1 to 6 carbon atoms; $R_6$ may be hydrogen, hydroxy, acyloxy of 1 to 6 carbon atoms or $R_5$ and $R_6$ taken together form a keto or a cyclic ketal group and $n$ is an integer of 1 to 2.

The symbols $R_1$, $R_2$, $R_3$, $R_4$, $R_5$, $R_6$ and $n$ as used hereinafter have the same meaning as defined above.

The compounds of this invention are assigned the following numbering system when $n=1$

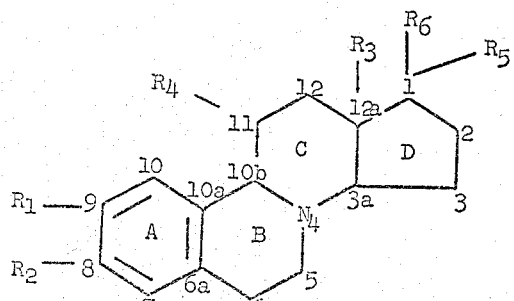

and when $n=2$

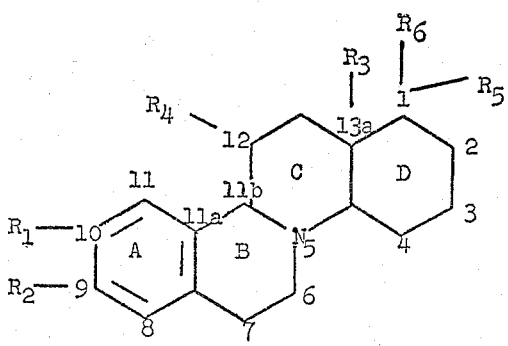

This invention also includes within its scope the novel process for the production of the above compounds. The compounds of this invention exhibit significant pharmacological activity and are useful as cardio-vascular agents or anti-inflammatory agents. They also exhibit steroidal activity. In use these compounds are combined with an inert pharmaceutical carrier to form dosage forms such as tablets, capsules, suspensions, elixirs and the like. They may also be combined with other therapeutic agents such as antibiotics, for example, the penicillins, the tetracyclines, analgesics, for example, namol xenyrate, steroids, for example, β-methasone, cardio-vascular agents, for example, pentaerythritoltetranitrate, glyceryl trinitrate and the like and tranquilizers such as 1,4-benzodiazepines.

In addition, these compounds are important intermediates for the production of compounds of the formula:

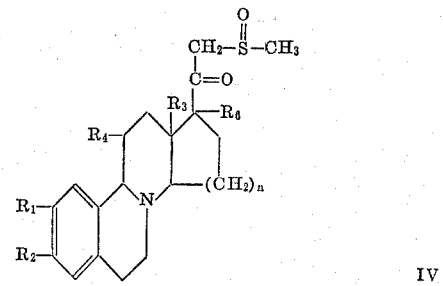

which may be prepared by reacting the products of this invention with dimethylsulfoxide in the presence of a strong basic catalyst. According to the process of our invention, the above products are prepared by treating a starting material of the formula:

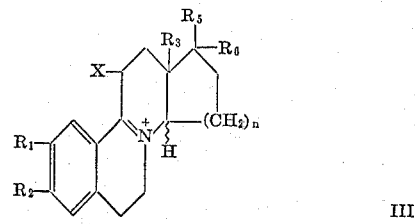

with an appropriate nucleophilic agent in a suitable solvent such as acetone, water or acetic acid. In the above Formula III, X is halogen and these starting materials are prepared in accordance with the method described in application Ser. No. 348,286 filed Feb. 18, 1964, now Patent No. 3,294,801. Starting materials for the preparation of III are generally described and claimed in our copending application, Ser. No. 248,872, filed Jan. 3, 1963, now Patent No. 3,341,543. The starting materials for III are prepared from $R_1$ and $R_2$ substituted phenylalkylamines of the general Formula A below and substituted ketoacids of the general Formula B below in accordance with the process described in our copending application Ser. No. 318,190, filed Oct. 23, 1963, now Patent No. 3,301,864. The $R_1$ and $R_2$ substituted phenylalkylamines such as 3,4-diethoxyphenylethylamines are well-known compounds which are described in the literature, for example in Chemical Abstracts, vol. 56, page 10006g, and by Ide et al., in J.A.C.S., vol. 59, page 726 (1937). The ketoacids of Formula B are prepared according to the process described in our copending application Ser. No. 310,146, filed Sept. 19, 1963, now Patent No. 3,301,889, using 2-$R_3$-cycloalkane-1,3-diones as starting material. Such 2-$R_3$-cycloalkane-1,3-diones are well-known in the art and may be prepared according to the procedure of Panouse and Sannie published in Bull Soc. Chim. France, 1955, page 1036. See also H. Smith, J.C.S. 1964, page 4472.

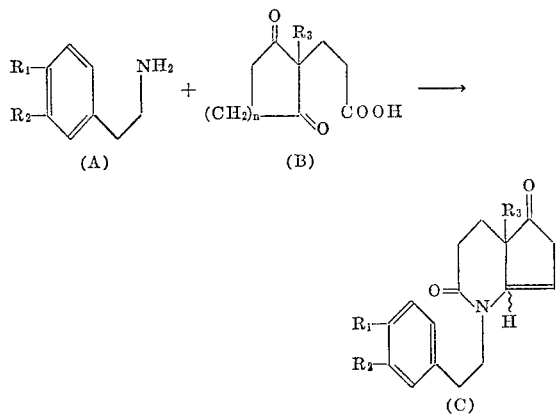

The keto lactam C is then cyclized with phosphorous oxychloride and further treated in accordance with the process set forth in said copending application. Nucleophilic reagents suitable for use in this reaction are, for example, the alkali and alkaline earth metal salts of organic acids such as potassium acetate, lithium formate, sodium propionate and the like. Also of use are salts derived by dissolving organic bases in organic acids as, for example, triethyl ammonium acetate and the like, or silver nitrate which is particularly useful for the preparation of 11 or 12 keto substituted quinolizines. Compound II may then be readily converted to compound I employing suitable reducing agents such as gaseous hydrogen in the presence of palladium on carbon.

In order to further illustrate this invention, the following examples are given:

Example 1.—2,3,3a,5,6,11,12,12a-octahydro-8-methoxy-11 - acetoxy - 1H - benz[a]cyclopenta[f]quinolizinium perchlorate A solution of 2.0 g. of 2,3,3a,5,6,11,12,12a-octahydro-8-methoxy-11-bromo - 1H - benz[a]cyclopenta[f]quinolizinium bromide in 10 ml. of acetic acid is added to a solution of 1 g. of fused potassium acetate in 10 ml. of acetic acid. The mixture is allowed to stand for 18 hours at ambient temperature. It is then filtered and concentrated to an oil. The oil is dissolved in water and the solution filtered. The filtrate is treated with 10% perchloric acid solution until precipitation is complete. The gummy precipitate is recrystallized from ethanol to give 2,3,3a,5,6,11,12,12a-octahydro - 8 - methoxy-11-acetoxy-1H - benz[a]cyclopenta[f]quinolizinium perchlorate as yellow crystals, M.P. 160–3° C.

Example 2.—2,3,3a,5,6,11,12,12a-octahydro-8-methoxy-11-acetoxy - 12a - methyl-1-carbethoxy-1H-benz[a]cyclopenta[f]quinolizinium perchlorate By the same reaction as described in Example 1, 2.0 g. of 2,3,3a,5,6,11,12,12a - octahydro - 8 - methoxy - 11-bromo - 12a-methyl-1-carbethoxy-1H-benz[a]cyclopenta[f]quinolizinium perchlorate gives 2,3,3a,5,6,11,12,12a-octahydro-8-methoxy-11-acetoxy-12a-methyl-1 - carbethoxy-1H - benz[a]cyclopenta[f]quinolizinium perchlorate as white crystals, M.P. 173–5° C. after recrystallization from ethanol.

Example 3.—2,3,3a,5,6,11,12,12a-octahydro-8-methoxy-11-keto - 1H - benz[a]cyclopenta[f]quinolizinium perchlorate A solution of 6.9 g. of silver nitrate in 500 ml. of acetonitrile is added to a solution of 8.3 g. of 2,3,3a,5,6,11,12,12a-octahydro-8-methoxy - 11 - bromo-1H-benz[a]cyclopenta[f]quinolizinium bromide in 500 ml. acetonitrile. The mixture is stirred at ambient temperature for 18 hours. The precipitated silver salts are filtered and the filtrate is concentrated to an oil. The oil is dissolved in water, filtered, and to the filtrate is added a 10% solution of perchloric acid. The gummy precipitate is recrystallized from methanol to give 2,3,3a,5,6,11,12,12a-octahydro-8-methoxy - 11 - keto-1H-benz[a]cyclopenta[f]quinolizinium perchlorate as yellow crystals, M.P. 182–4° C.

Example 4.—2,3,3a,5,6,11,12,12a-octahydro-8-methoxy-11-keto-12a-methyl - 1 - carbethoxy-1H-benz[a]cyclopenta[f]quinolizinium perchlorate By the same reaction as described in Example 3, 76 g. of 2,3,3a,5,6,11,12,12a - octahydro - 8 - methoxy - 11-bromo-12a-methyl-1-carbethoxy-1H - benz[a]cyclopenta[f]quinolizinium bromide gives 2,3,3a,5,6,11,12,12a-octahydro-8-methoxy-11-keto-12a - methyl-1-carbethoxy-1H - benz[a]cyclopenta[f]quinolizinium perchlorate as yellow crystals, M.P. 168–71° C. after recrystallization from methanol.

Example 5.—2,3,3a,5,6,11,12,12a - octahydro-8-methoxy-11 - keto - 12a-methyl-1-hydroxy-1-carbomethoxy-1H-benz[a]cyclopenta[f]quinolizinium perchlorate By the same reaction as described in Example 3, 66.1 g. of 2,3,3a,5,6,11,12,12a - octahydro-8-methoxy-11-bromo-12a-methyl - 1 - hydroxy-1-carbomethoxy-1H-benz[a]cyclopenta[f]quinolizinium bromide gives 2,3,3a,5,6,11,12, 12a-octahydro - 8 - methoxy-11-keto-12a-methyl-1-hydroxy - 1 - carbomethoxy-1H-benz[a]cyclopenta[f]quinolizinium perchlorate as yellow crystals, M.P. 140–3° C. after recrystalization from methanol.

Example 6.—1,2,3,3a,5,6,10b,11,12,12a - decahydro - 8-methoxy-11-acetoxybenz[a]cyclopenta[f]quinolizine To a solution of 0.5 g. of 2,3,3a,5,6,11,12,12a-octahydro-8-methoxy-11-acetoxy-1H-benz[a]cyclopental[f]quinolizinium perchlorate, prepared according to Example 1, in 50 ml. of methanol is added in portions over 1 hour a total of 0.5 g. of potassium borohydride. The mixture is evaporated to a gum, and the residue is partitioned with water and ether. The ether phase is dried and concentrated to give 1,2,3,3a,5,6,10b,11,12,12a - decahydro-8-methoxy-11-acetoxy - benz[a]cyclopenta[f]quinolizine as a mixture of isomers about positions 10b and 11, M.P. 136–41° C.

Example 7.—1,2,3,3a,5,6,10b,11,12,12a - decahydro - 8-methoxy-11-hydroxy-benz[a]cyclopenta[f]quinolizine A solution of 1.5 g. of 1,2,3,3a,5,6,10b,11,12,12a-decahydro-8-methoxy-11-acetoxy - benz[a]cyclopenta[f]quinolizine in 20 ml. of ethanol is diluted with 50 ml. of 5% sodium hydroxide solution. The mixture is heated to 100°

C. for ½ hour. It is then concentrated to remove most of the ethanol, and the oily precipitate is extracted with ether. The ether is dried and concentrated to give 1,2,3,3a,5,6,10b,11,12,12a - decahydro-8-methoxy-11-hydroxybenz[a]cyclopental[f]quinolizine as a white solid mixture of isomers, M.P. 130-50° C. The mixture of isomers may be separated by chromatography on alumina. Elution with 1% EtOH in ether affords two pure isomers, M.P. 171° C. for the first eluted isomer, and M.P. 190-1° C. for the second eluted isomer. Elution with 3% ethanol in ether affords the third isomer, M.P. 177-8° C.

Example 8.—1,2,3,3a,5,6,10b,11,12,12a - decahydro - 8-methoxy-11-hydroxy-benz[a]cyclopenta[f]quinolizine A solution of 0.5 g. of 2,3,3a,5,6,11,12,12a-octahydro-8 - methoxy-11-keto-1H-benz[a]cyclopenta[f]quinolizinium perchlorate in 25 ml. of methanol is treated with 0.5 g. of potassium borohydride over the course of 1 hour. The mixture is concentrated to an oil and partitioned between water and ether. The ether is dried and concentrated to give 1,2,3,3a,5,6,10b,11,12,12a - decahydro - 8-methoxy-11-hydroxybenz[a]cyclopenta[f]quinolizine as a mixture of two isomers. The mixture may be separated into the 171° C. and 190-1° C. melting isomers by the technique described in Example 7.

Example 9.—1,2,3,3a,5,6,10b,11,12,12a - decahydro - 8-methoxy-11-hydroxy-12a-methyl - 1 - carbethoxybenz[a]cyclopenta[f]quinolizine By the same reaction as described in Example 8, 17.1 g. of 2,3,3a,5,6,11,12,12a-octahydro-8-methoxy-11-keto-12a - methyl-1-carbethoxy-1H-benz[a]cyclopenta[a]quinolizinium perchlorate gives 1,2,3,3a,5,6,10b,11,12,12a-decahydro-8-methoxy-11-hydroxy - 12a-methyl-1-carbethoxy-benz[a]cyclopenta[f]quinolizine as white crystals, M.P. 148-9° C. after recrystalization from ethyl acetate.

Example 10.—1,2,3,3a,5,6,10b,11,12,12a - decahydro-8-methoxy-12a-methyl-1,11-dihydroxy - 1-carbomethoxybenz[a]cyclopenta[f]quinolizine In the same way as described in Example 8, 12 g. of 2,3,3a,5,6,11,12,12a-octahydro-8-methoxy - 12a - methyl-1-hydroxy-1-carbomethoxy - 11 - keto-1H-benz[a]cyclopenta[f]quinolizinium perchlorate gives 1,2,3,3a,5,6,10b,11,12,12a-decahydro - 8 - methoxy-12a-methyl-1,11-dihydroxy-1-carbomethoxy - benz[a]cyclopenta[f]quinolizine as white crystals, M.P. 154° C. after recrystallization from ethyl acetate.

Example 11.—1,2,3,3a,5,6,10b,11,12,12a - decahydro-8-methoxy-11-hydroxy-12a-methyl - 1 - carbethoxy-benz[a]cyclopenta[f]quinolizine A solution of 1.0 g. of 2,3,3a,5,6,11,12,12a-octahydro-8-methoxy-11-keto-12a-methyl - 1 - carbethoxy-1H-benz[a]cyclopenta[f]quinolizinium perchlorate in 200 ml. of methanol containing 0.3 g. of 10% palladium on carbon catalyst is hydrogenated at ambient temperature and 50 p.s.i. until hydrogen absorption is complete, usually about ½ hour. The catalyst is filtered and the filtrate concentrated to 5 ml. volume. The slurry is cooled overnight in an ice chest and filtered to give a small crop of unchanged starting perchlorate. The filtrate is concentrated to dryness and the residue is partitioned between ether and 5% sodium hydroxide solution. The ether solution is dried and concentrated to give an oil. The oil is recrystallized from ethyl acetate to give 1,2,3,3a,5,6,10b,11,12,12a-decahydro-8-methoxy-11-hydroxy-12a-methyl - 1 - carbethoxy-benz[a]cyclopenta[f]quinolizine, M.P. 132-7° C.

It is understood that the foregoing detailed description is given merely by way of illustration and that many variations may be made therein without departing from the spirit of our invention.

Having described our invention, what we desire to secure by Letters Patent is:

We claim:

1. A member selected from the group consisting of compounds of the formula:

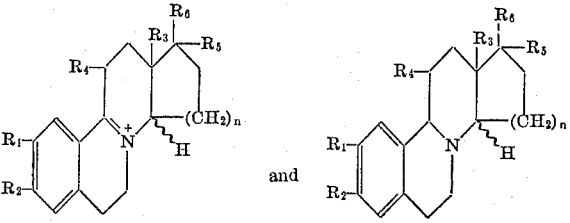

in which $R_1$ and $R_2$ are each a member of the group consisting of hydrogen, hydroxy, lower alkoxy and $R_1$ and $R_2$ taken together form a methylenedioxy group; $R_3$ is a member selected from the group consisting of hydrogen, methyl or ethyl, $R_4$ is a member selected from the group consisting of hydroxy, lower alkanoyloxy and keto; $R_5$ is a member selected from the group consisting of hydrogen, carboxy and

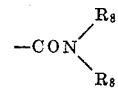

in which $R_8$ is a member selected from the group consisting of hydrogen and lower alkyl; R is a member of the group consisting of hydrogen, hydroxy, lower alkanoyloxy and $R_5$ and $R_6$ taken together form a cyclic ketal group and ketone.

2. 2,3,3a,5,6,11,12,12a - octahydro-8-methoxy-11-acetoxy-1H-benz[a]cyclopenta[f]quinolizinium perchlorate.

3. 2,3,3a,5,6,11,12,12a - octahydro-8-methoxy-11-acetoxy - 12a - methyl - 1-carbethoxy-1H-benz[a]cyclopenta[f]quinolizinium perchlorate.

4. 2,3,3a,5,6,11,12,12a - octahydro-8-methoxy-11-keto-1H-benz[a]cyclopenta[f]quinolizinium perchlorate.

5. 2,3,3a,5,6,11,12,12a - octahydro-8-methoxy-11-keto-12a - methyl - 1 - carbethoxy-1H-benz[a]cyclopenta-[f]quinolizinium perchlorate.

6. 2,3,3a,5,6,11,12,12a - octahydro-8-methoxy-11-keto-12a - methyl - 1 - hydroxy-1-carbomethoxy-1H-benz[a]cyclopenta[f]quinolizinium perchlorate.

7. 1,2,3,3a,5,6,10b,11,12,12a - decahydro - 8-methoxy-11-acetoxy-benz[a]cyclopenta[f]quinolizine.

8. 1,2,3,3a,5,6,10b,11,12,12a - decahydro - 8-methoxy-11-hydroxy-benz[a]cyclopenta[f]quinolizine.

9. 1,2,3,3a,5,6,10b,11,12,12a - decahydro - 8-methoxy-11 - hydroxy-12a-methyl-1-carbethoxy-benz[a]cyclopenta-[f]quinolizine.

10. 1,2,3,3a,5,6,10b,11,12,12a - decahydro - 8-methoxy-12a - methyl - 1,11-dihydroxy-1-carbomethoxybenz[a]cyclopenta[f]quinolizine.

References Cited

Osborne et al.: J. Pharm. and Expt'l Therap., vol. 147, pp. 212-224, 1965.

Cram et al.: "Organic Chemistry," McGraw-Hill, 1959, p. 188.

Djerrassi: "Steroidal Reactions," Holden-Day, 1963, p. 558.

NICHOLAS S. RIZZO, Primary Examiner.

ALEX MAZEL, Examiner.

D. DAUS, Assistant Examiner.